United States Patent
Zheng et al.

(10) Patent No.: US 12,245,032 B2
(45) Date of Patent: Mar. 4, 2025

(54) METHODS AND APPARATUS TO DISCRIMINATE AUTHENTIC WIRELESS INTERNET-OF-THINGS DEVICES

(71) Applicant: Orange, Issy-les-Moulineaux (FR)

(72) Inventors: Tao Zheng, Beijing (CN); Xiaoyu Wang, Beijing (CN); Xin Wang, Beijing (CN)

(73) Assignee: ORANGE, Issy-les-Moulineaux (FR)

( * ) Notice: Subject to any disclaimer, the term of this patent is extended or adjusted under 35 U.S.C. 154(b) by 349 days.

(21) Appl. No.: 17/602,663

(22) PCT Filed: Apr. 9, 2020

(86) PCT No.: PCT/IB2020/000356
§ 371 (c)(1),
(2) Date: Oct. 8, 2021

(87) PCT Pub. No.: WO2020/208426
PCT Pub. Date: Oct. 15, 2020

(65) Prior Publication Data
US 2022/0182824 A1    Jun. 9, 2022

(30) Foreign Application Priority Data
Apr. 9, 2019 (WO) ............... PCT/CN2019/081970

(51) Int. Cl.
*H04W 12/06* (2021.01)
*G06N 3/044* (2023.01)

(52) U.S. Cl.
CPC ............ *H04W 12/06* (2013.01); *G06N 3/044* (2023.01)

(58) Field of Classification Search
None
See application file for complete search history.

(56) References Cited

U.S. PATENT DOCUMENTS 9,210,534 B1 * 12/2015 Matthieu ............... H04L 51/066
9,633,197 B2 * 4/2017 Lakshmanan ......... H04W 4/029
(Continued)

FOREIGN PATENT DOCUMENTS

| CN | 106535175 A | 3/2017 |
| CN | 107409073 A | 11/2017 |
| CN | 109067763 A | 12/2018 |

OTHER PUBLICATIONS

Doshi et al.; Machine Learning DDOS Detection for Consumer Internet of Things Devices; IEEE (Year: 2018).*

(Continued)

*Primary Examiner* — Kambiz Zand
*Assistant Examiner* — Mahabub S Ahmed
(74) *Attorney, Agent, or Firm* — Knobbe, Martens, Olson & Bear, LLP

(57) ABSTRACT

Methods and apparatus are described for automatically discriminating authentic wireless Internet-of-Things (IoT) devices using a trained machine-learning module. In a training phase, the machine-learning module is trained to identify authentic IoT devices based on data in frame headers of wireless data emitted by the IoT devices. The trained machine-learning module may identify authentic IoT devices without analysing data from the payload of the frames to which the frames headers belong, and thus the privacy of data in the payload of the frame is not compromised and encryption of the payload data does not adversely affect performance of the trained machine-learning module in a subsequent production phase. Each training data sample may consist of header data from a sequence of successive frames of wireless data from authentic wireless IoT devices and, to enhance accuracy, may exclude address data.

15 Claims, 4 Drawing Sheets

(56) References Cited

U.S. PATENT DOCUMENTS

| | | | |
|---|---|---|---|
| 9,749,901 B2* | 8/2017 | Seok | H04L 67/568 |
| 9,942,254 B1* | 4/2018 | Averbuch | H04L 63/145 |
| 10,064,059 B1* | 8/2018 | Yu | H04W 48/12 |
| 10,346,614 B1* | 7/2019 | Ko | H04L 9/3247 |
| 10,826,902 B1* | 11/2020 | Aksu | H04L 41/14 |
| 11,140,695 B1* | 10/2021 | Eyuboglu | H04W 72/535 |
| 11,206,549 B1* | 12/2021 | Eyuboglu | H04W 72/1273 |
| 11,665,052 B2* | 5/2023 | Chamarajnager | H04L 63/102 726/6 |
| 2004/0081079 A1* | 4/2004 | Forest | H04L 43/00 370/216 |
| 2007/0025265 A1* | 2/2007 | Porras | H04W 12/122 370/252 |
| 2008/0291013 A1* | 11/2008 | McCown | H04W 12/12 340/5.2 |
| 2013/0128808 A1* | 5/2013 | Wentink | H04L 61/2596 370/328 |
| 2014/0105098 A1* | 4/2014 | Chu | H04B 7/15528 370/315 |
| 2014/0195666 A1* | 7/2014 | Dumitriu | H04L 43/55 709/223 |
| 2015/0029880 A1* | 1/2015 | Burns | H04W 4/70 370/252 |
| 2015/0039513 A1* | 2/2015 | Adjaoute | G06Q 30/0609 705/44 |
| 2016/0212099 A1* | 7/2016 | Zou | H04L 63/1408 |
| 2016/0337390 A1 | 11/2016 | Sridhara et al. | |
| 2017/0126262 A1* | 5/2017 | Zakaria | H04B 17/318 |
| 2017/0149614 A1* | 5/2017 | Zheng | H04L 41/12 |
| 2017/0149937 A1* | 5/2017 | Ren | H04W 4/70 |
| 2017/0180357 A1* | 6/2017 | Ghosh | H04W 12/06 |
| 2017/0230832 A1* | 8/2017 | Ophir | H04W 12/06 |
| 2018/0020501 A1* | 1/2018 | Aboul-Magd | H04L 27/2602 |
| 2018/0034914 A1* | 2/2018 | Christopher | H04L 69/18 |
| 2018/0054423 A1* | 2/2018 | Liu | H04L 63/061 |
| 2018/0063079 A1* | 3/2018 | Ding | H04L 63/0464 |
| 2018/0077062 A1* | 3/2018 | Park | G07C 5/0841 |
| 2018/0092151 A1* | 3/2018 | Liu | H04W 24/02 |
| 2018/0124048 A1* | 5/2018 | Yoo | H04L 9/0836 |
| 2018/0139088 A1* | 5/2018 | Lin | H04L 41/0873 |
| 2018/0183882 A1* | 6/2018 | Flynn | H04L 69/321 |
| 2018/0184290 A1* | 6/2018 | Luo | H04L 63/0442 |
| 2018/0219920 A1* | 8/2018 | Patel | H04L 63/0876 |
| 2018/0225671 A1* | 8/2018 | Brown | H04L 63/0861 |
| 2018/0234787 A1* | 8/2018 | Karimli | H04W 4/70 |
| 2018/0288015 A1* | 10/2018 | Kudaraya | H04L 61/5092 |
| 2018/0288179 A1* | 10/2018 | Bhatia | H04L 45/645 |
| 2018/0310175 A1* | 10/2018 | Kim | H04W 4/70 |
| 2018/0376448 A1* | 12/2018 | Wild | H04W 68/005 |
| 2019/0036896 A1* | 1/2019 | Khushu | H04L 63/08 |
| 2019/0045067 A1* | 2/2019 | Warrick | H04M 15/63 |
| 2019/0058697 A1* | 2/2019 | Chang | H04L 63/0807 |
| 2019/0098028 A1* | 3/2019 | Ektare | H04L 41/0893 |
| 2019/0116555 A1* | 4/2019 | Kristem | H04L 5/0092 |
| 2019/0132205 A1* | 5/2019 | Du | H04L 41/145 |
| 2019/0141526 A1* | 5/2019 | Bahrami | H04L 63/083 |
| 2019/0158975 A1* | 5/2019 | Petersen | H04W 4/70 |
| 2019/0166091 A1* | 5/2019 | Gupta | H04L 61/2571 |
| 2019/0238524 A1* | 8/2019 | Copty | H04L 9/083 |
| 2019/0261178 A1* | 8/2019 | Rajadurai | H04W 12/069 |
| 2019/0296979 A1* | 9/2019 | Gupta | G06N 20/00 |
| 2019/0349426 A1* | 11/2019 | Smith | H04W 4/70 |
| 2019/0349433 A1* | 11/2019 | Smith | H04L 61/4505 |
| 2020/0021586 A1* | 1/2020 | Schmidt | H04L 63/20 |
| 2020/0021983 A1* | 1/2020 | Annaiah | H04W 12/50 |
| 2020/0059976 A1* | 2/2020 | Bhatia | H04W 8/005 |
| 2020/0076799 A1* | 3/2020 | Lackey | G06F 21/73 |
| 2020/0082397 A1* | 3/2020 | Cooperman | H04L 9/3271 |
| 2020/0112855 A1* | 4/2020 | Zhan | H04W 80/00 |
| 2020/0126050 A1* | 4/2020 | Savolainen | H04L 12/14 |
| 2020/0267543 A1* | 8/2020 | Byers | H04W 12/65 |
| 2020/0389469 A1* | 12/2020 | Litichever | H04W 4/40 |
| 2021/0029149 A1* | 1/2021 | Harada | H04W 88/18 |
| 2021/0058258 A1* | 2/2021 | Chen | H04L 9/0618 |
| 2021/0065919 A1* | 3/2021 | Jetzfellner | H04L 12/2816 |
| 2021/0126990 A1* | 4/2021 | Wang | H04L 63/126 |
| 2021/0203491 A1* | 7/2021 | Wei | H04W 12/043 |
| 2022/0046114 A1* | 2/2022 | Entelis | H04L 12/40 |
| 2022/0086070 A1* | 3/2022 | Sivaraman | H04L 47/2483 |

OTHER PUBLICATIONS

Thamilarasu et al.; Towards Deep-Learning-Driven Intrusion Detection for the Internet of Things; (Year: 2019).*

Punithavathi et al.; A lightweight machine learning-based authentication framework for smart IoT devices; 2019 Elsevier Inc. (Year: 2019).*

Jafari et al.; IoT Devices Fingerprinting using Deep Learning; IEEE (Year: 2018).*

Bai et al.; Automatic Device Classification from Network Traffic Streams of Internet of Things; IEEE (Year: 2018).*

International Search Report dated Jul. 7, 2020 for Application No. PCT/IB2020/000356.

International Search Report dated Jan. 9, 2020 for Application No. PCT/CN2019/081970.

Franklin J et al: "Passive Data Link Layer 802 .11 Wireless Device Driver Fingerprinting", Proceedings of the Usenix Security Symposium, xx, No. 15th, Aug. 1, 2006 (Aug. 1, 2006), pp. 167-178, XP002669055, p. 167-p. 174.

Markus Miettinen et al: "IoT Sentinel: Automated Device-Type Identification for Security Enforcement in IoT", arxiv.org, Cornell University Library, 201 Olin Library Cornell University Ithaca, NY 14853, Nov. 15, 2016 (Nov. 15, 2016), XP081361966, DOI: 10.1109/ICDCS.2017.283, abstract, p. 3, left-hand column.

* cited by examiner

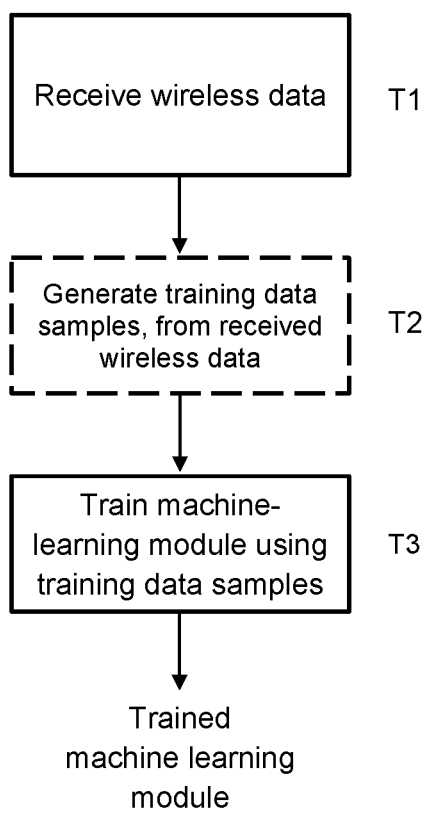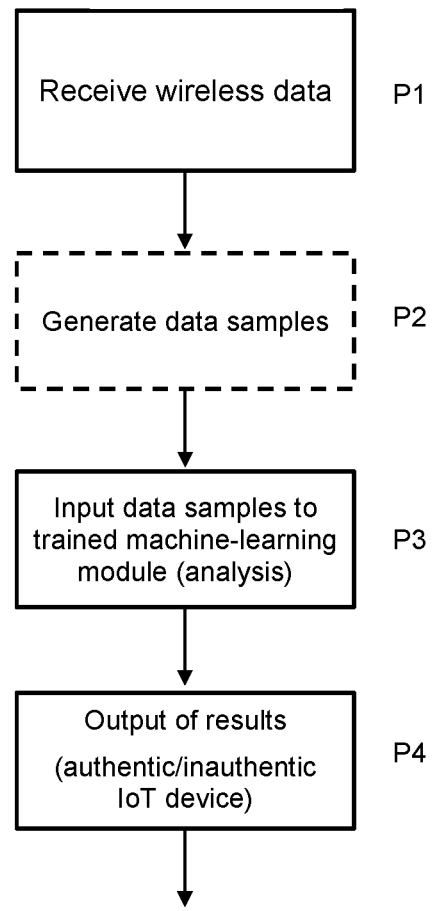

METHODS AND APPARATUS TO DISCRIMINATE AUTHENTIC WIRELESS INTERNET-OF-THINGS DEVICES

RELATED APPLICATIONS

This application is the U.S. National Phase of Application No. PCT/IB2020/000356 entitled "METHODS AND APPARATUS TO DISCRIMINATE AUTHENTIC WIRELESS INTERNET-OF-THINGS DEVICES" and filed Apr. 9, 2020, which claims priority to Patent Application No. PCT/CN2019/081970, filed Apr. 9, 2019, each of which is incorporated by reference in its entirety.

The present invention relates to the field of the Internet of Things (IoT). More particularly, the invention relates to apparatus and methods to discriminate authentic wireless IoT devices automatically.

The Internet of Things is becoming progressively better established, and increasing numbers of IoT devices are being brought into operation. IoT devices and terminals face many serious security threats including, but not limited to, unauthorized modifications, faking of devices, and so on.

U.S. Pat. No. 9,536,072 proposes the use of machine learning to analyse the behaviour of electronic devices and their users, including the behaviour of IoT devices. A trained machine-learning algorithm is used to determine when an electronic device has been stolen or is behaving in an unusual manner (which may indicate that malicious software is operating on the device). During the training phase, this system establishes one or more local user profiles that represent observed user-specific behaviours according to a centroid sequence. The local user profile may be classified into a baseline profile model that represents aggregate behaviours associated with various users over time. During the production phase, the system may generate a current user profile model comprising a centroid sequence re-expressing user-specific behaviours observed over a particular time interval, and the current user profile model may be compared to plural baseline profile models to identify the baseline profile model closest to the current user profile model. A change in operator may be detected where the baseline profile model closest to the current user profile model differs from the baseline profile model.

U.S. Pat. No. 9,536,072 is based on analysis of device behaviour and so, if an inauthentic device copies the usual behaviour of an authentic device, the system will not detect a problem.

Moreover, a large number of services make use of IoT devices which communicate wirelessly and often these are more easily attacked. As a result, it is becoming increasingly important to assure the security of wireless IoT devices. Notably, there is a need for methods and systems to automatically discriminate authentic wireless IoT devices, so that they can be differentiated from inauthentic wireless devices (i.e. illicitly-modified devices, fake devices, unauthorized devices, and so on).

The present invention has been made in the light of these issues.

Embodiments of the present invention provide a wireless-IoT-device discrimination apparatus, comprising:
 a receiver to receive wireless data from IoT devices;
 a trained machine-learning module to receive and analyse data received by the receiver; and
 an interface to output the result of analysis of data by the trained machine-learning module as an indication of identification of an authentic or inauthentic wireless IoT device;
wherein the trained machine-learning module is arranged to analyse data from frame headers of frames of wireless data received from wireless IoT devices.

Embodiments of the invention further provide a corresponding computer-implemented method to authenticate wireless IoT devices, as specified in appended claim 6.

Embodiments of the invention still further provide a computer program comprising instructions which, when the program is executed by a processor, cause the processor to carry out the method according to any one of appended claims 6 to 13.

Embodiments of the invention still further provide a computer-readable medium comprising instructions which, when executed by a processor, cause the processor to carry out the method according to any one of appended claims 6 to 13.

The above-mentioned wireless-IoT-device discrimination apparatus, wireless-IoT-device discrimination method, computer program and computer-readable medium may enable the automatic discrimination of authentic wireless IoT devices. In this document the expression "discrimination" is used in a general sense to cover cases (apparatus, methods) where the output indicates that an authentic device has been identified, cases where the output indicates that an inauthentic device has been identified, and cases where the output can indicate whether a device is judged to be authentic or inauthentic. Furthermore, the expression "wireless IoT device" simply designates an IoT device which emits wireless data (irrespective of whether that device may also emit data in a wired fashion).

The above-mentioned wireless-IoT-device discrimination device, wireless-IoT-device discrimination method, computer program and computer-readable medium perform the discrimination of wireless IoT devices using machine learning applied to data from frame headers of wireless data emitted by IoT devices. It has been found that this approach can provide good accuracy in identification of authentic devices.

The trained machine-learning module may be arranged to analyse data from the frame headers without analysing data taken from the payload of the frames to which said frames headers belong. Often the data in the payload of frames of wireless data emitted by IoT devices is encrypted. By excluding frame payload data from the analysis, the trained machine-learning device is able to perform its analysis in a generic manner irrespective of whether the data received from wireless IoT devices is encrypted or unencrypted. Furthermore, by omitting frame payload data from the analysis, the apparatus and methods according to the invention preserve the privacy of the payload data.

The trained machine-learning module may be arranged to analyse frame header data that excludes address data representing the address of the device providing the wireless data. It is common for hackers to fake IoT devices' addresses (e.g., MAC address, IP address, etc.). By excluding address data from the analysis performed by the machine-learning module, the discrimination accuracy may be improved.

The trained machine-learning module may be arranged to analyse data samples, each data sample comprising a set of data items extracted from each one of a sequence of successive frame headers. The set of data items may comprise data items extracted from at least three successive frame headers. Experiments have shown that discrimination results of high accuracy may be obtained in a case where the trained machine-learning module is trained using data samples consisting of this type of time-series data.

Different technologies may be used to implement machine-learning modules. Certain embodiments of the invention use LSTM (Long Short-Term Memory) units to analyse patterns in the above-mentioned time series data.

Further features and advantages of embodiments of the present invention will become apparent from the following description of said embodiments, which is given by way of illustration and not limitation, illustrated by the accompanying drawings, in which:

FIG. 2 illustrates processes involved in training and using a machine-learning module in the apparatus of FIG. 1, in which:

FIG. 2A is a flow diagram illustrating processes in a training phase, and

FIG. 2B is a flow diagram illustrating processes in a production phase (use of the trained machine-learning module);

FIG. 5 schematically illustrates process flows between apparatus components during the training phase and production phase, in which:

Certain embodiments of the invention will now be described for the purposes of illustration, not limitation.

Figure 1:
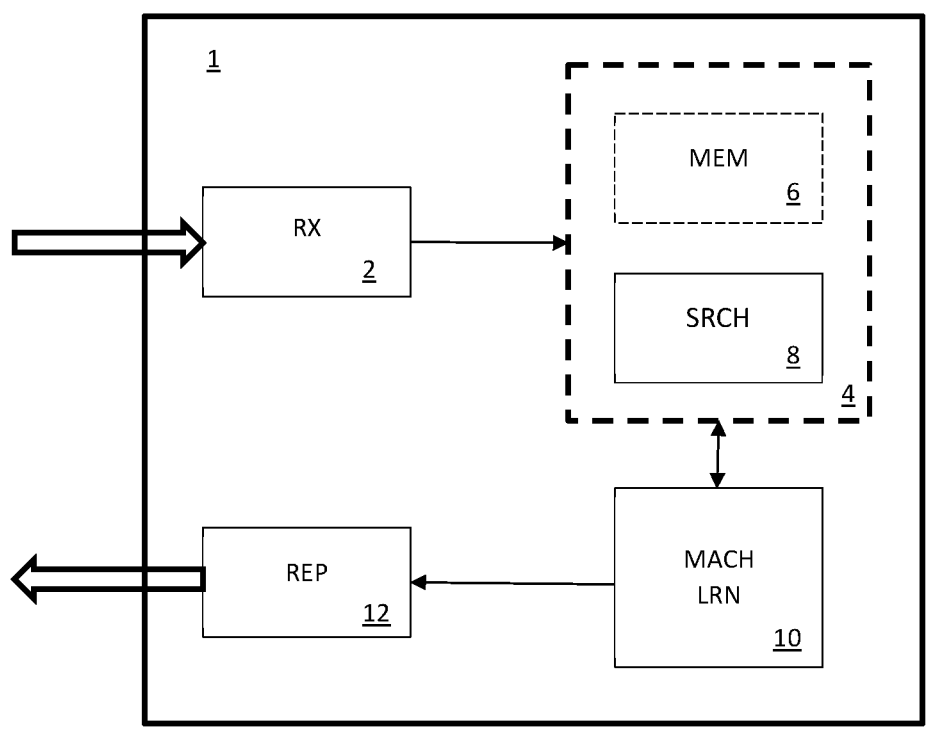
FIG. 1 is a block diagram schematically illustrating components of a discrimination apparatus according to an embodiment of the invention.

FIG. 1 illustrates a discrimination apparatus 1 according to a first embodiment of the invention. As can be seen from FIG. 1, the main components of the apparatus 1 are a receiver (RX) 2 to receive wireless data from IoT devices, a machine-learning module (MACH LRN) 10 to analyse received data and an output interface (REP) 12 to inform a user of the result of the analysis performed by the machine-learning module 10. The discrimination apparatus may also include a wireless information storage and search unit 4, or it may communicate with an external storage/search unit (not shown) over a wired or wireless communication channel.

The receiver (RX) 2 receives data output wirelessly by IoT devices. The receiver 2 may be arranged to collect and/or monitor the data. The receiver 2 may format and shape the received data, for example so as to extract, from the received signals, the data that will be used by the machine-learning module 10 for discrimination purposes. The receiver 2 may store the received data, or the formatted/shaped data, in a storage medium that is internal to or external of the discrimination apparatus 1, for example a storage medium (MEM) 6 in a wireless information storage and search unit 4.

The machine-learning module 10 analyses data received from wireless IoT devices to perform discrimination of IoT devices. The machine-learning module 10 requires training in order to be able to perform discrimination. Typically, the machine-learning module 10 is operated in a training phase and in a production phase. In the training phase the machine-learning module 10 is trained, using training data, to discriminate wireless IoT devices: for example, to be able to recognize authentic devices, to be able to recognize inauthentic devices and/or to be able to generate output indicative of whether a subject device is authentic or inauthentic.

Discrimination apparatus 1 embodying the invention may be supplied with the machine-learning module 10 already pre-trained, or the apparatus 1 may be supplied with the machine-learning module 10 untrained (so that the user can select the training data set to be used for training the machine-learning module 10). Even in a case where the machine-learning module is already pre-trained at the time of supply of the discrimination apparatus 1, additional training may be performed using extra data collected during operation of the discrimination apparatus 1.

In the production phase, data received from a subject IoT device (e.g. a newly-discovered IoT device) is input to the trained machine-learning module 10 and the output of the trained machine-learning module 10 then indicates whether the subject IoT device is authentic or inauthentic.

The output interface 12 is arranged to produce an output indicating the result of the analysis performed by the machine-learning module 10.

The output interface 12 may be designed in different manners. For example, in certain embodiments of the invention the output interface 12 is configured to produce an alert in the case where the output of the machine-learning module 10 indicates that an inauthentic IoT device has been detected. The alert may take any convenient form including but not limited to visual (e.g. lighting an indicator lamp, displaying a message on a screen, producing a printed message or report, transmission of an SMS, etc.) and audible forms (generation of a tone, spoken message, and so on). In certain embodiments of the invention the output interface 12 is arranged to output a report on the result of the analysis performed by the machine-learning module 10 irrespective of the nature of that result (i.e. irrespective of whether the result demonstrates detection of an authentic or inauthentic IoT device). Of course, if desired the output interface 12 may be configured to produce an alert in the case where the output of the machine-learning module 10 indicates that an authentic IoT device has been detected.

The output interface 12 may be constructed using different technologies depending on the application, on the type of output (alert or report) that is to be produced, and on the intended recipient of the output (e.g. a local or remote user, a network operator, a data-collecting module, etc.). Various non-limiting examples include configuring the output interface 12 as a graphical user interface, as a wireless communications interface, as a wired interface, and so on.

The discrimination apparatus 1 may be implemented in various ways on hardware and/or software. For example, the discrimination apparatus may be implemented on a general-purpose computer by suitable programming of the computer (in which case, it will be appreciated that the various components illustrated in FIG. 1 represent various functions implemented by the computer). The recited functionality may be defined by instructions in a computer program, and execution of the instructions by a processor can implement this functionality. The present invention provides such computer programs, as well as computer-readable media (discs, tapes, USB keys, etc.) storing such instructions.

Typically, the discrimination apparatus 1 may be applied in a networked environment. The discrimination apparatus 1 may be integrated into a network component (e.g. an access node) or may be a server or other standalone device. The discrimination apparatus 1 may capture wireless data frames emitted by IoT devices in a variety of ways. For example, the discrimination apparatus 1 may work in different ways according to the monitoring protocol. In cases where the WiFi protocol is used, the discrimination apparatus 1 may work in the monitoring mode, and may poll all channels or just focus on specific channels. In cases where the Bluetooth protocol is used, the discrimination apparatus 1 may chase specific channels according to the protocol, and so on.

FIG. 2 illustrates processes involved in training and using the machine-learning module 10 of the discrimination apparatus of FIG. 1.

FIG. 2A is a flow diagram illustrating processes in the training phase, and FIG. 2B is a flow diagram illustrating processes in the production phase (where the trained machine-learning module is exploited).

During the training phase, data from wireless IoT devices is received (step T1). The data can be collected over a desired time interval. The data may come from wireless IoT devices that are known to be authentic or known to be inauthentic (in the case of supervised learning), or can come from IoT devices whose status-authentic or inauthentic—is not known (in the case of unsupervised learning). Depending on the application, the received data may be formatted or shaped to a greater or lesser extent (step T2) to produce training data samples that will be used to train the machine-learning module. Thus, for example, the wireless data received from a given IoT device i may be processed to extract, from the headers of a sequence of P successive frames, the values of a set of N parameters. The P×N data matrix for IoT device i then constitutes a single training data sample.

The machine learning module 10 is then trained (step T3) using the set of training data samples. The number of training data samples used in the training process can be set as desired and, in general, a greater number of training data samples results in improved discrimination performance during the production phase. Likewise, different algorithms can be used to implement the training process. When using certain learning algorithms, the whole data set is presented to the machine-learning module plural times (i.e. there are plural epochs).

After the machine-learning module 10 has undergone training using the training data samples, the machine-learning module 10 is considered to be "trained". It can be considered that, during the training phase, the machine-learning module develops a model relating its inputs into an output indicative of a desired evaluation (e.g. a general evaluation such as is the subject IoT device an authentic device, or is the subject IoT device an inauthentic device, or a more specific evaluation such as: is the subject IoT device a device which has undergone modification, is the subject IoT device a device produced by a specified manufacturer, and so on), In general, it is useful to validate the model which has been developed by the machine-learning module during the training phase. Typically, this involves inputting, to the trained machine-learning module, some data samples which relate to IoT devices having known status (authentic/inauthentic) or known properties, and checking what percentage of these data samples are correctly classified by the trained machine-learning module. Assuming that the validation process shows that the trained machine-learning module has adequate performance, the trained machine-learning module 10 is then used, during the production phase, to process data samples obtained from target IoT devices in order to discriminate authentic/inauthentic devices.

As illustrated in FIG. 2B, during the production phase, data from wireless IoT devices is received (step P1). Typically, some wireless data is received from a subject IoT device and it is not known a priori whether this subject IoT device is authentic or inauthentic. Depending on the application, the received data may be formatted or shaped to a greater or lesser extent (step P2) to produce a data sample for analysis. In general, the data sample has the same format as the training data samples that were used in the training process T3 performed during the training phase. Thus, for example, if the machine-learning module was trained using training data samples consisting of the values of P parameters extracted from the headers of N successive frames then the data sample analysed in respect of the subject IoT device during the production phase likewise consists of the values of the P parameters extracted from the headers of N successive frames of wireless data received from the subject IoT device.

The data sample derived from the subject IoT device is then input to the trained machine-learning module for analysis thereby (step P3). The results output from the trained machine-learning module give rise to an output (step P4) which indicates, for example, that the subject IoT device is authentic or inauthentic.

The inventors have conducted experiments regarding how machine learning can enable authentic and/or inauthentic IoT devices to be discriminated. The experiments show that good discrimination performance can be obtained in the case where the data input to the machine-learning module 10 in the training phase and the production phase is data extracted from the headers of frames of wireless data output by IoT devices.

Furthermore, in some embodiments the machine-learning and subsequent identification is based on analysis of data from frame headers, but not data from the payload of the frames of wireless data. This avoids difficulties which otherwise can arise due to the fact that the payload of frames of wireless data emitted by IoT devices can often be encrypted. Furthermore, the payload portions of the frames may well contain personal data or data that is commercially sensitive. The privacy of the wireless data is preserved by excluding the payroll data from the information that is input to the machine-learning module 10.

The headers of wireless data frames generally contain address information and, unfortunately, hackers often fake such address information. Accordingly, certain embodiments of the invention exclude address information from the information that is input to the machine-learning module 10.

It has been found that good discrimination results are obtained in the case where each sample of data that is input to the machine-learning module consists of data extracted from each one of a sequence of plural successive frame headers. In this case the information from wireless IoT devices is treated as multiple time series, and the time series data is used to train the machine learning module and identified by the model which the machine-learning module develops as it is trained.

An example will now be given in the context of discriminating IoT devices that emit data according to the WiFi specification (e.g. IEEE 802.11a).

In this example, the data input to the machine-learning module 10 is time-series data taken from a sequence of P successive frames of WiFi data and, from each frame header, information is taken which corresponds to a particular selection of N parameters from among the parameters that are present in WiFi frame headers. In the specific example described here, data is taken from a sequence of 10 successive frames of WiFi data and the N parameters that are exploited by the machine-learning module 10 are: Duration, SN (Sequence Number), Signal Strength, Frame Length, and Delta Time (i.e. time between two contiguous frames).

Accordingly, in this example the information input to the machine-learning module 10 has the structure of a matrix as shown below:

| Frame 10 duration SN strength length Δt | Frame 9 duration SN strength length Δt | Frame 8 duration SN strength length Δt | Frame 7 duration SN strength length Δt | Frame 6 duration SN strength length Δt | Frame 5 duration SN strength length Δt | Frame 4 duration SN strength length Δt | Frame 3 duration SN strength length Δt | Frame 2 duration SN strength length Δt | Frame 1 duration SN strength length Δt |
|---|---|---|---|---|---|---|---|---|---|

In this example, wherein the machine-learning module 10 handled time series data, the machine-learning module was implemented using LSTM (Long Short-Term Memory) to analyse the patterns in this kind of time series and to identify them.

Figure 3:
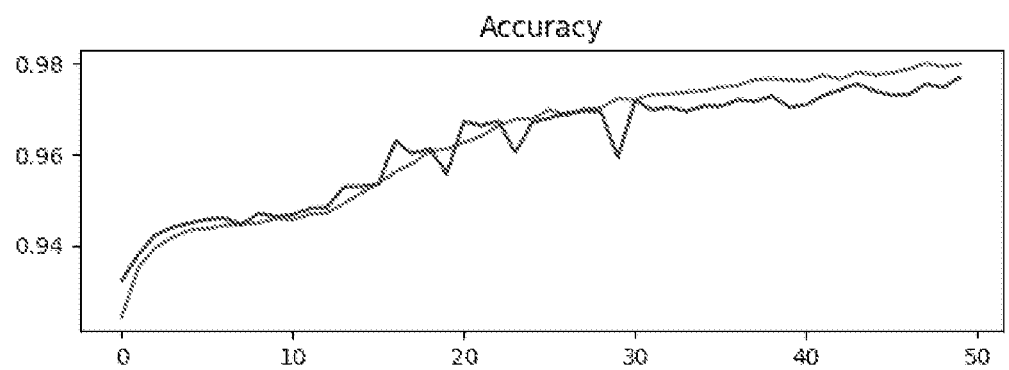
FIG. 3 is a graph illustrating how, in tests, the accuracy of the discrimination performance of the discrimination apparatus was found to vary as a function of the number of epochs.
Figure 4:
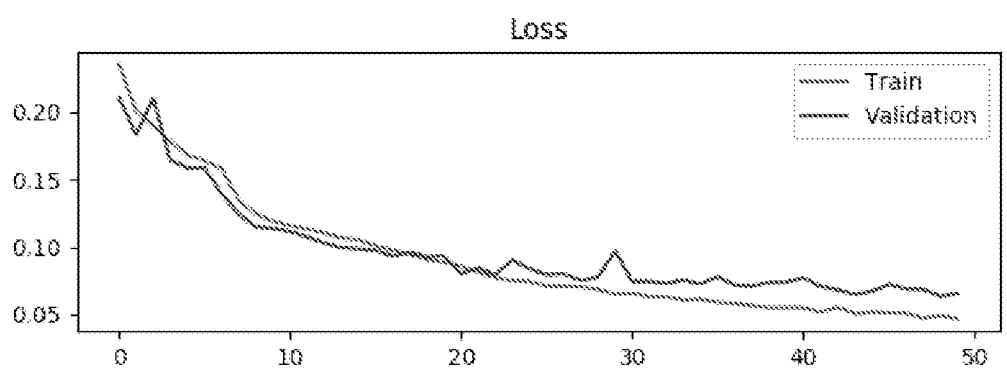
FIG. 4 is a graph illustrating how, in tests, the loss of the discrimination apparatus was found to vary as a function of the number of epochs.

FIGS. 3 and 4 illustrate results that were obtained in the case where the machine-learning module 10 used three LSTM layers and the size of each LSTM's hidden layer was 128. The number of epochs in the training process was 50, and each epoch used the same training data. The batch size of the training data set was 32.

More precisely, FIG. 3 illustrates how the accuracy of the output from the machine-learning module 10 varied as the number of epochs increased, during the training and production phases, while FIG. 4 illustrates how the loss (summation of errors) varied as the number of epochs increased, during the training and production phases.

As can be seen from FIGS. 3 and 4, the validation result was very close to the training result. Furthermore, good accuracy (>97%) and small loss (<8%) were achieved.

Although time series data from 10 successive frames is used in the above example (i.e. P=10), the number of frames in the sequence can be changed. Experimental results show that it is beneficial to include at least three frames in the time series. Although no explicit upper limit on the length of the sequence has been identified so far, as the number of frames included in the time series increases there is an increase in the time required to train the machine-learning module and an increase in the amount of time taken by the trained machine-learning module to perform analysis. Furthermore, the times series may include data from headers of frames which, although in time order, are not successive to one another: for example, data may be taken from every other frame header in a time series of 2P frames. It will be understood that the manner of selecting frame headers to constitute the sequence used in the production phase should be the same as in the training phase.

Although the above example makes use of data relating to five parameters in the headers of WiFi frames (i.e. N=5), the number of parameters that are used can be adjusted depending on the amount of difference there is between authentic and inauthentic IoT devices. For example, in some cases there are significant differences between the frame-header data output by authentic and inauthentic IoT devices and it is permissible to train the machine-learning module 10 simply using two parameters, e.g. SN and delta time. However, if the difference between authentic and inauthentic wireless IoT devices is very slight then it may be necessary to use 5 parameters (e.g. all 5 of the parameters in the above example) to enable devices to be discriminated. The number N of parameters that are used by the machine learning module 10 affects the accuracy of identification, with a larger value of N being associated with a greater degree of identification accuracy. The design of the machine learning module itself is not affected by the specific parameters that are selected, except insofar as the input of the machine-learning algorithm needs to be adapted to the number of parameters.

Although the above example is given in the context of discriminating IoT devices that emit data according to the WiFi specification, the invention may be applied to discriminate IoT devices that emit data frames that correspond to other wireless standards, for example, Bluetooth, Zigbee, Cellular network specifications, and so on. In the case of embodiments handling these other technical standards, various parameters can be extracted from the headers of the wireless data and input to the machine-learning module, for example: the size of wireless data, delta time of sequence data, the session/sequence/paragraph number, signal strength, the existing/unexpired time, and the transmission speed (in some cases where variable bitrate transmission is involved).

Although the above example concerns a case in which the machine-learning module 10 used LSTM units to analyse time series data, other machine-learning architectures could be used, for example support vector machines (SVMs), other forms of recurrent neural networks (RNNs), Hidden Markov models, gated recurrent units (GRUs), and so on. Moreover, the number of layers in the machine-learning architecture is not limited to three as in the example above. Better results were obtained using an LSTM architecture compared to using an SVM architecture.

As noted above, the discrimination apparatus 1 may include a wireless information storage and search unit 4. This wireless information storage and search unit 4 may include a storage medium or memory 6 in which data provided by the receiver 2 is stored. The stored data may include data formatted and/or shaped by the receiver 2 and, if desired, raw data received from wireless IoT devices. The wireless information storage and search unit 4 may also include a querying module (SRCH) 8 to allow queries to be performed on the data held in the storage medium/memory 6.

Figure 5A:
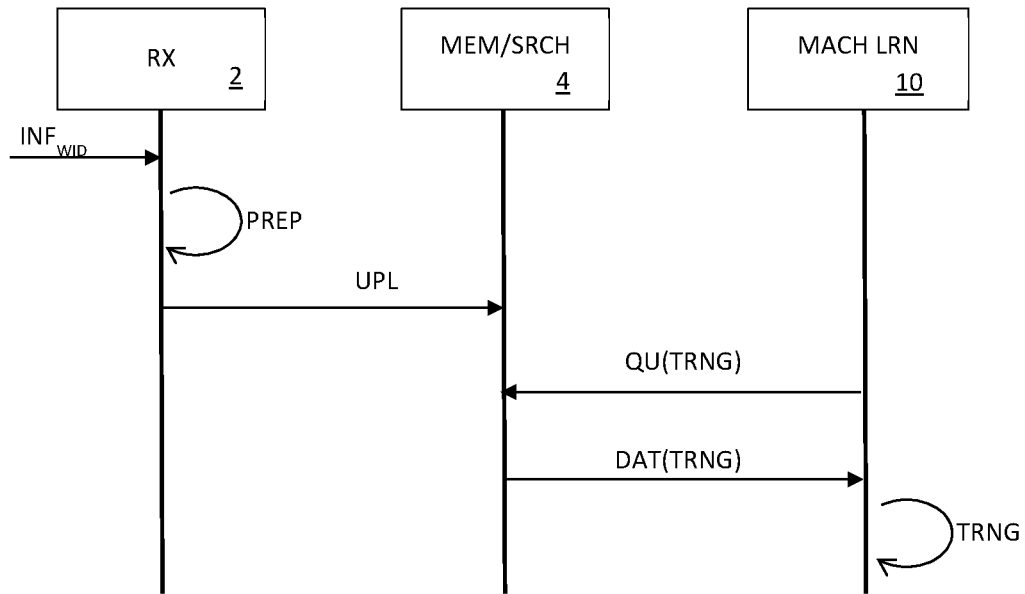
FIG. 5A illustrates process flows during the training phase.
Figure 5B:
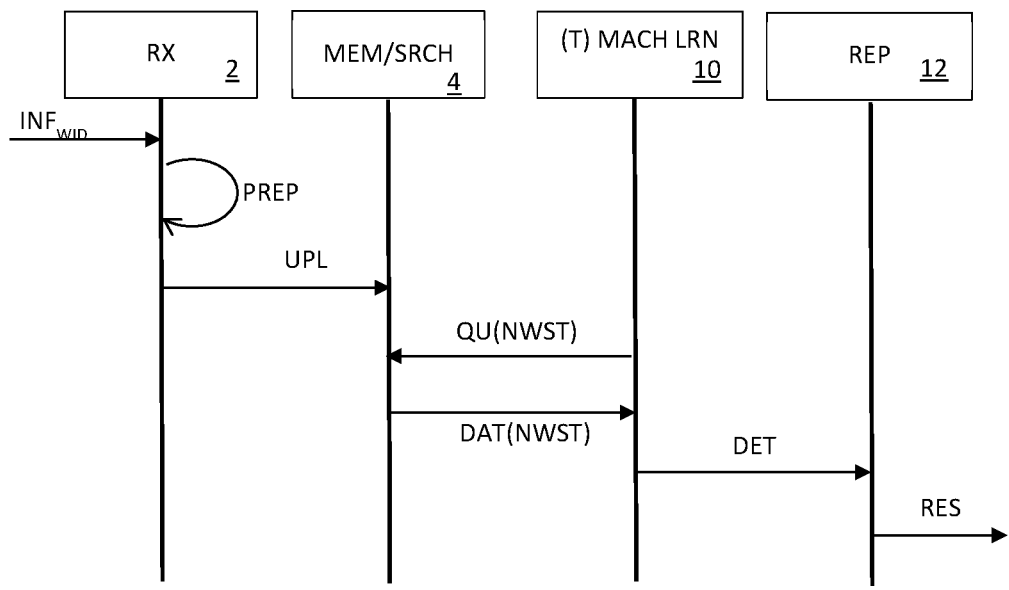
FIG. 5B illustrates process flows in the production phase.

A description will now be given of FIGS. 5A and 5B which illustrate examples of process flows which may take place in a discrimination apparatus 1 according to FIG. 1 during the training phase and production phase, respectively. FIGS. 5A and 5B relate to an example in which the discrimination apparatus 1 includes a wireless information storage and search unit 4. In FIG. 5B, "(T) MACH LRD" represents the trained machine-learning module.

a) Training Phase

The receiver 2 collects wireless data ($INF_{WID}$) emitted by IoT devices. The receiver 2 preferably performs formatting and shaping (PREP) of the received data at this stage, before uploading it (UPL) to the wireless information storage and search unit 4. The machine-learning module 10 sends a query (QU(TRNG)) to the wireless information storage and search unit 4 requesting a training data set. Typically, the query is formulated by the system designer. The query defines the nature of the requested training data, for example, indicating a time slot to be covered by the sequence of frames, and the parameters from the frame headers that are to be used in the training method (e.g. SN, delta time, and so on). For instance, the query could request supply of a training data set from time 1 to time 2 including specified data items. The wireless information storage and search unit 4 sends a training data set (DAT(TRNG) to the machine-learning module 10. The machine-learning module 10 performs a training process (TRNG) to establish an internal model to relate its inputs to a desired evaluation output.

b) Production Phase (Discrimination/Identification Phase)

The receiver 2 collects wireless data ($INF_{WTD}$) emitted by IoT devices. The receiver 2 preferably performs formatting and shaping (PREP) of the received data, before uploading it (UPL) to the wireless information storage and search unit 4. The machine-learning module 10 sends a query (QU (NWST)) to the wireless information storage and search unit 4 requesting a new data sample, for example a data sample relating to the most recently uploaded IoT data, this new data sample relating to a subject IoT device for which it is desired to determine whether or not it is an authentic device. The wireless information storage and search unit 4 sends the requested new data sample (DAT(NWST)) to the trained machine-learning module 10. The trained machine-learning module 10 applies the received data sample at its inputs and produces an output DET which indicates the evaluation result. The output interface 12 produces a signal RES indicating the result produced by the trained machine-learning module.

During the production phase (identification phase) the output from the trained machine learning algorithm can be said to "identify" the subject device which has provided the data sample undergoing analysis. In other words, the output may be a value which indicates that the subject IoT device is an original/legal/not modified/authentic device or a modified/fake/illegal device. If the training data set focuses on data relating to IoT devices of a particular type (e.g. having certain functions), the trained machine-learning module may produce an output which indicates whether or not a subject IoT device which produces a data sample undergoing analysis is a device of this particular type. Likewise, if the training data set focuses on data relating to a specific IoT device (e.g. device A belonging to user B), the trained machine-learning module may produce an output which indicates whether or not an analysed data sample was produced by the specific IoT device A.

Although the invention has been described above with reference to certain specific embodiments, it is to be understood that various modifications and adaptations may be made within the scope of the appended claims.

The invention claimed is:

1. An apparatus configured to discriminate authentic wireless-IoT-devices, the apparatus comprising:
    a receiver configured to receive wireless data from IoT devices;
    a trained machine-learning module configured to receive and analyse the wireless data received by the receiver; and
    an interface to output the result of analysis of the wireless data by the trained machine-learning module as an indication of identification of a wireless IoT device as one of an authentic wireless IoT device or an inauthentic wireless IoT device, wherein an inauthentic wireless IoT device is at least one of modified, fake, illegal, or unauthorized, wherein the trained machine-learning module is arranged to analyse data from frame headers of frames of the wireless data received from the wireless IoT devices, wherein the trained machine-learning module is configured to analyse frame header data that excludes address data representing an address of a device providing the wireless data, wherein the trained machine-learning module is configured to analyse a set of parameters of the frame header data, a number of the parameters in the set of parameters being dependent upon an amount of difference between authentic and inauthentic wireless IoT devices.

2. The apparatus of claim 1, wherein the machine-learning module is configured to analyse data from said frame headers without analysing data from the payload of the frames to which said frames headers belong.

3. The apparatus of claim 1, wherein the trained machine-learning module is configured to analyse data samples, each data sample comprising a set of data items extracted from each one of a sequence of frame headers.

4. The apparatus of claim 3, wherein the set of data items comprises data items extracted from at least three frame headers.

5. The apparatus of claim 1, wherein the trained machine-learning module comprises long short-term memory units.

6. The method of claim 1, additionally comprising increasing the number of parameters in the set of parameters the trained machine-learning module is configured to analyse upon a determination that a difference between authentic and inauthentic wireless IoT devices is below a threshold difference.

7. The method of claim 1, additionally comprising decreasing the number of parameters in the set of parameters the trained machine-learning module is configured to analyse upon a determination that a difference between authentic and inauthentic wireless IoT devices is above a threshold difference.

8. A computer-implemented method of discriminating authentic wireless IoT devices, the method comprising:
    receiving wireless data from IoT devices;
    analysing, using a trained machine-learning module, the received wireless data; and
    outputting the result of the analysis by the trained machine-learning module to indicate identification of a wireless IoT device as one of an authentic wireless IoT device or an inauthentic wireless IoT device, wherein an inauthentic wireless IoT device is at least one of modified, fake, illegal, or unauthorized, and wherein the analysing by the trained machine-learning module comprises analysing data from frame headers of frames of the wireless data received from the wireless IoT devices, wherein the analysing by the trained machine-learning module comprises analysing frame header data that excludes address data representing an address of a device providing the wireless data, wherein the trained machine-learning module is configured to analyse a set of parameters of the frame header data, a number of the parameters in the set of parameters being dependent upon an amount of difference between authentic and inauthentic wireless IoT devices.

9. The method of claim 8, wherein the analysing by the trained machine-learning module comprises analysing data from said frame headers without analysing data from the payload of the frames to which said frames headers belong.

10. The method of claim 8, wherein the analysing by the trained machine-learning module comprises analysing data samples, each data sample comprising a set of data items extracted from each one of a sequence of frame headers.

11. The method of claim 8, the method further comprising:

a training phase wherein the trained machine-learning module is trained, using training data, to discriminate between authentic and inauthentic wireless IoT devices, wherein said training data consist of data from frame headers, but not data from the payload, of frames of wireless data received from authentic wireless IoT devices.

12. The method of claim 11, wherein said training data consists of frame header data that excludes address data representing the address of the device providing the wireless data.

13. The method of claim 11, wherein each training data sample comprises of a set of data items extracted from each one of a sequence of frame headers.

14. A computer comprising a processor and a memory, the memory having stored thereon instructions which, when implemented by the processor, cause the processor to implement the method of claim 8.

15. A non-transitory computer-readable medium having stored thereon instructions which, when executed by a processor, cause the processor to implement the method of claim 8.

* * * * *